United States Patent Office 2,947,644
Patented Aug. 2, 1960

2,947,644
ARTIFICIAL FIBRES
Claude Giddey, Carouge, Geneva, Switzerland, assignor to F.P. Research Limited, Mowbray, England, a company of Great Britain No Drawing. Filed Mar. 4, 1958, Ser. No. 718,961

Claims priority, application Great Britain Mar. 14, 1957

7 Claims. (Cl. 106—157)

The present invention is concerned with artificial fibres which consist predominantly of protein.

In the conventional processes for the production of protein fibres, a relatively concentrated aqueous solution of protein is aged to increase its viscosity to a value suitable for spinning, and is then spun, i.e. extruded through a spinneret, into a coagulating bath. The solution of protein is prepared from protein which has been isolated, for example by precipitation from a crude protein extract at the isoelectric point followed by separation of the precipitated protein from the liquor. The liquor thus retains the non-protein water-soluble matter. The purified protein is suspended in water, and is brought into solution by increasing the pH value, for example by the addition of alkali. The ageing process consists of a treatment at an alkaline pH value, for example pH 10 to 13, and may take many hours, though adjustment of the pH value may accelerate the process somewhat. This ageing process is not only long and expensive, but is susceptible to interference, and may be hindered by the presence of sugars, amino-acids and salts such as those which are to be found in crude protein extracts. Moreover, in order to obtain by an ageing process a viscosity suitable for the spinning operation, the solution of protein must be relatively concentrated, usually above 200 g. per litre.

It has now been found that the addition to a solution containing protein of a polysaccharide having acidic side groups, or a mixture of such polysaccharides, affords several advantages in the production of artificial fibres consisting predominantly of protein. The polysaccharides should be water-soluble either in the form of their free acids or as one of their salts.

Such polysaccharides, or mixtures of such polysaccharides, when added to a solution containing protein, enable a viscosity suitable for the spinning operation to be obtained without a conventional ageing process and, furthermore, solutions of protein may be used which are too weak or too impure for satisfactory ageing to be carried out. The addition of such polysaccharides to a solution containing protein before spinning may also result in fibres with modified physical properties, for example having greater strength or increased water-absorption, and allows the production of fibres from protein solutions of such low concentrations or purity that satisfactory fibres could not be formed in the absence of polysaccharide.

The properties and reactions of polysaccharides having acidic side groups vary with the nature of the side groups. A polysaccharide with strongly acidic side groups, for example sulphate groups, will readily react with proteins forming complexes involving ionic bonding, hydrogen bonding, and Van der Walls' forces. Such polysaccharides are soluble in water in the form of their free acids and as their calcium salts, as well as in the form of their ammonium or alkali metal salts. Polysaccharides with weakly acidic side groups, for example carboxylic groups, react with proteins to a much smaller, sometimes almost negligible extent, and in the form of their free acids or their calcium salts are insoluble in water. They are soluble in water in the form of their ammonium or alkali metal salts.

An object of the present invention is to provide an improved process of producing artificial fibres consisting predominantly of protein, whereby one or more of the advantages referred to in the previous paragraph may be obtained.

According to the present invention, a process for producing artificial fibres consisting predominantly of protein comprises the steps of extruding through a spinneret a viscous, aqueous solution containing a protein and at least one polysaccharide having acidic side groups, and coagulating the said protein and polysaccharide to form a fibre.

The said solution should contain from 30 to 300 g. per litre protein and preferably about 100 g. per litre. The ratio of protein to polysaccharide should lie between 1:1 and 200:1, and preferably from 2:1 to 20:1.

The invention further resides in an artificial fibre having a composition comprising protein and at least one polysaccharide having acidic side groups.

A polysaccharide having strongly acidic side groups which will react with a protein, for example a polysaccharide having sulphate side groups, of which type the carrageenins are commercially available examples, may when added in relatively low concentrations to an aqueous solution containing a protein, increase the viscosity of the solution to a value suitable for the spinning operation. The solution of protein may be of considerably lower concentration than is required when a suitable viscosity is to be achieved by conventional ageing. The solution of protein may take the form of a crude extract, there being no necessity to eliminate other water-soluble materials.

When a polysaccharide having strongly acidic side groups is used in relatively high concentrations, the resulting fibre will have some modified physical properties, for example improved strength and increased water-absorption. The modification of physical properties obtainable with carrageenins is, however, limited by the rather low solubility of the polysaccharide, especially in the unrefined state.

The concentration of carrageenin which may be used in a solution containing protein for the purposes of the invention may be from 0.1 to 50 g. per litre and, when no other polysaccharide having acidic side groups is added, preferably about 10 g. per litre. The most suitable concentration varies with the state of purity of the carrageenin and with the proportions of different cations it contains.

The increase in viscosity in the presence of a polysaccharide having strongly acidic side groups is effected by the temperature of the solution and by the proportions of different cations associated with the polysaccharide. Sodium, potassium and calcium are the cations commonly encountered in the case of carrageenin, and the proportions present vary somewhat with different samples of commercial carrageenin. The development of the desired viscosity may be achieved at temperatures from 20° to 100° C. The viscosity obtained depends on the time of heating and on the temperature. An increase in the temperature tends to give an increase in the resultant viscosity. The process is conveniently carried out by raising the solution slowly to a given temperature, the viscosity obtained depending not only on the maximum temperature achieved but also on the time taken to reach this temperature. Heating for about 20 minutes, to reach a maximum of about 80° C. at the end of this period, is preferable in most cases.

A polysaccharide having weakly acidic side groups, for example a polysaccharide having carboxylic side groups, such as a sodium, potassium or ammonium alginate, when added in a relatively low concentration before spinning to an aqueous solution containing a protein and coagulated together with the protein in the coagulating bath, improves the strength and water-absorption of the fibre. Such a polysaccharide can also be used to increase the viscosity of a protein solution to a value suitable for the spinning operation, but because of the very limited interaction between proteins and polysaccharides having weakly acidic side groups, the concentration of such a polysaccharide necessary to obtain a suitable viscosity is relatively high. In some cases, the addition of sufficient alginate to give a desired viscosity may result in a preponderance of polysaccharide in the finished fibre. The desired viscosity is preferably obtained either by conventional ageing or by the use of a polysaccharide having strongly acidic side groups. When conventional ageing is employed, an isolated protein should be used as the starting material, and it is preferred to obtain the desired viscosity before the addition of the polysaccharide. It is not necessary to heat a solution of protein to which only polysaccharides having weakly acidic side groups have been added. When the desired viscosity is obtained by using a polysaccharide having strongly acidic side groups, a polysaccharide having weakly acidic side groups may be added at the same time as one with strongly acidic side groups.

The concentration of alginate which may be used in a solution containing protein for the purposes of the invention may be from 1 to 50 g. per litre and, when no other polysaccharide having acidic side groups is added, is preferably from 4 to 50 g. per litre. When the solution containing protein without an addition of a polysaccharide having acidic side groups, has not a sufficiently high viscosity for spinning, and alginate is used to obtain this viscosity, it should preferably be added at a concentration of from 20 to 50 g. per litre. Concentration of alginate of from 4 to 20 g. per litre are preferred for addition to an aged protein solution having a viscosity of from 5 to 20 poises.

A mixture of polysaccharides of which one has strongly acidic side groups and another has weakly acidic side groups may be used with advantage, since only a relatively low concentration of the former is necessary to obtain a viscosity suitable for the spinning operation, and only a relatively low concentration of the latter to obtain a stronger and more water-absorbent fibre. The total concentration of such a mixture of polysaccharide may lie between 1 and 10 g. per litre, and preferably about 5 g. per litre. A mixture of 1 g. per litre unrefined carrageenin and 4 g. per litre alginate gives particularly good results with a solution containing about 100 g. per litre protein. The concentration of carrageenin may be reduced when a refined, more reactive sample is used.

Proteins suitable for use in a process according to the present invention are soluble in water under alkaline or weakly alkaline conditions. They may be of animal or vegetable origin. Examples of such proteins are blood serum proteins, including albumin, globulin and fibrin, gelatin, milk proteins, including casein, lactalbumin and lactoglobulin, and plant proteins, such as zein, soya protein, peanut protein, cotton-seed protein and edestin. Such proteins may be used in solutions which contain polysaccharides having strongly or weakly acidic side groups or mixtures of both these types, but fibres formed from whey proteins (lactalbumin and lactoglobulin) in the presence only of polysaccharides having weakly acidic side groups are much inferior to those formed from these proteins in the presence of a polysaccharide having strongly acidic side groups. This is due to the appreciable solubility of relatively uncombined whey proteins at the isoelectric point. Mixtures of proteins may also be used.

Fibres may be produced by a process according to the invention starting from isolated proteins, which may for example be produced by precipitating the protein from a crude protein extract at the isoelectric point of the protein and separating the precipitated protein from the liquor, for example by centrifugation or in a yeast extractor. When an isolated protein is used, the solution may be prepared by dispersing the protein in water and adding alkali until a pH value is obtained at which the protein will dissolve, usually from pH 7 to 9. If an alkali derivative of a protein, for example sodium caseinate, is used, addition of alkali may be unnecessary to obtain solution. Alternatively, when a polysaccharide is used under such conditions that it will promote the development of a viscosity suitable for spinning, this being more readily achieved with polysaccharides having strongly acidic side groups, the protein need not be purified by isolation and the solution of protein may take the form of a crude protein extract. For example, a crude extract of plant protein may be obtained by dispersing and soaking a protein-containing meal in a weakly alkaline aqueous solution, preferably of pH value 7 to 9, and removing the insoluble components of the meal, for example by centrifuging.

The polysaccharide or mixture of polysaccharides may be dissolved in water before adding protein to obtain the solution to be spun, but it is preferable, especially when relatively high concentrations of polysaccharide are to be used, to dissolve the polysaccharide in a previously prepared solution of protein.

When a polysaccharide having strongly acidic side groups, for example carrageenin, is used to obtain a viscosity of a protein solution suitable for the spinning operation, it may be added to the freshly prepared protein solution, and other polysaccharides may be added at the same stage.

A solution containing protein and polysaccharide suitable for extrusion through a spinneret of conventional type should have a viscosity of from 0.5 to 20 poises, and preferably from 2 to 5 poises.

The solution containing protein and polysaccharide and having a suitable viscosity may then be spun by extrusion through a spinneret of conventional type.

After the spinning operation, the protein and polysaccharide is coagulated in a coagulating bath to form a fibre, which may be withdrawn from the coagulating bath and washed, for example in water.

The coagulating bath used to coagulate fibres spun from a solution containing protein and a polysaccharide having sulphate side groups, for example carrageenin, should be relatively strongly acid preferably of a pH value from 1 to 3, preferably about 1.3. The addition of metallic salts, such as calcium chloride, is unnecessary, but may result in a fibre of improved texture. When the solution being spun contains protein and a polysaccharide having only weakly acidic side groups, the coagulating bath should preferably contain a salt of a metal which forms an insoluble salt with the polysaccharide, for example calcium chloride, preferably in a concentration of about 100 g. per litre $CaCl_2.6H_2O$, and the solution preferably has a pH value approximately equal to the isoelectric point of the protein, usually pH 4.5–5.5. Alternatively the bath may have a pH value of about 1.3, at which value denaturation and precipitation of the protein occurs in many cases. However, some proteins, in the absence of polysaccharides with strongly acidic side groups, are soluble in acidic solutions of pH 1.3. At such a low pH value metal ions such as calcium ions are not necessary, insoluble alginic acid being formed in their absence.

The coagulating bath used when spinning a solution containing protein and a mixture of a polysaccharide having strongly acidic side groups with a polysaccharide having weakly acidic groups should have a pH value of from 1 to 3, preferably about 1.3. It should also preferably contain a salt of a metal which forms an insoluble salt with the polysaccharide having weakly acidic side groups, for example calcium chloride. Calcium chloride is preferably used at a concentration of 100 g. per litre $CaCl_2.6H_2O$. If such metal ions are omitted, the polysaccharide having weakly acidic side groups will normally be precipitated in the form of the free acid.

The fibres may be hardened, if required, after coagulation and washing, for example by formaldehyde.

The following are examples of how the invention may be carried into effect.

*Example 1*

One kilogram defatted peanut meal, with a maximum of 1% fat and containing about 50% solid protein, was suspended in 10 litres water and the pH value adjusted to 8.5 with sodium hydroxide (30% solution), and the dispersion was stirred for 1½ hours at room temperature. The insoluble part of the meal was eliminated by centrifuging at 500 $g$ in a basket centrifuge with nylon cloth, and a clear extract was obtained which contained about 50 g. per litre protein. 500 g. fresh defatted ground-nut meal was then extracted in the same way with 5 litres clear solution from the first extraction. After the second centrifuging, a clear extract was obtained which had a protein content of approximately 100 g. per litre, together with other soluble substances. 1 g. per litre Gomarine (relatively unrefined carrageenin obtainable from Alginate Maton, France) and 4 g. per litre commercial sodium alginate were then dispersed and dissolved in the clear protein extract. The solution so obtained was then gradually heated in a water bath to 80° C. over a period of 20 minutes, and then cooled and filtered. The viscosity of the resulting solution was approximately 2 poises as measured by a Brookfield multi-speed viscometer (the same preparative method giving on other occasions solutions having viscosities of from 1 to 5 poises). The viscous solution was then spun horizontally through a glass spinneret, having 400 holes of 0.2 mm. diameter, into a coagulating bath consisting of an aqueous solution of 100 g. per litre $CaCl_2.6H_2O$ adjusted to pH 1.3 with hydrochloric acid, the coagulating bath being at room temperature. The protein and polysaccharide were coagulated to form fibres which were withdrawn and washed in a current of water.

*Example 2*

A clear extract containing about 50 g. per litre peanut protein was obtained by a single extraction process as described in the first two sentences of Example 1. The extract was then acidified with hydrochloric acid (lactic acid or sulphur dioxide may also be used) to pH 4.7. The protein was precipitated, and separated off in a yeast separator into a slurry containing about 200 g. per litre protein. The slurry was washed in the separator with a spray of cold water. The washed slurry was then diluted with fresh water to 100 g. per litre protein content, and the pH value adjusted to pH 8.5 with sodium hydroxide, thus solubilising the protein. To the alkaline solution of isolated protein so obtained was added 1 g. per litre Gomarine and 4 g. per litre sodium alginate, and the solution was gradually heated to 80° C. over a period of 20 minutes. After cooling and filtering the solution it was spun and coagulated as described in Example 1.

*Example 3*

The process described in Example 1 was carried out, with the exception that 0.1 g. per litre Gelcarine MR (a refined, highly reactive carrageenin obtainable from Algin Corporation of America) was used instead of the 1 g. per litre Gomarine used in Example 1.

*Example 4*

One kilogram defatted peanut meal was extracted with 10 litres of water at pH 8.5 and centrifuged to give an extract containing about 50 g. per litre protein. Five further quantities of defatted peanut meal were then successively extracted with the same liquor, in each case using ten parts of liquor to one of meal, and an extract was ultimately obtained which contained about 300 g. per litre protein, together with other soluble substances. 1 g. per litre Gomarine and 4 g. per litre commercial sodium alginate were added and the solution obtained heated, cooled and filtered as in Example 1. The solution, which had a viscosity of approximately 20 poises was spun and coagulated to form fibres as described in Exaxmple 1.

*Example 5*

The process described in Example 1 was carried out, with the exception that 10 g. per litre Gelcarine MR was used instead of the mixture of Gomarine and sodium alginate used in Example 1. The viscosity of the viscous solution was between 5 and 20 poises.

It was found that though the use of calcium chloride in the coagulating bath was not essential, satisfactory fibres being obtained by the use of a simple acid bath at pH 1.3, the presence of calcium cloride in the bath improved the texture of the fibres. The fibres were of rather lower strength than those obtained by the process described in Example 1.

*Example 6*

The process described in Example 2 was carried out, with the exception that 10 g. per litre Gelcarine MR was used instead of the mixture of Gomarine and sodium alignate used in Example 2. The fibres obtained were of rather lower strength than those obtained by the process of Example 2.

*Example 7*

A clear extract containing about 100 g. per litre of protein was prepared by the double extraction process described in Example 1. In this extract 30 g. per litre sodium alginate was stirred and dissolved. Heating of the resulting solution was not necessary. The solution had a viscosity of approximately 20 poises as measured by a Brookfield multi-speed viscometer (the same preparative method giving on other occasions solutions having viscosities of from 5 to 20 poises, varying with different samples of alginate). The solution was spun as described in Example 1 into a coagulating bath consisting of a solution containing 100 g. per litre $CaCl_2.6H_2O$, adjusted to pH 4.7 (the isoelteric point of peanut protein), and the fibres so formed were withdrawn and washed.

The resulting fibres were not so good as those obtained by the process of Example 1, partly by reason of their high polysaccharide content, and partly due to the fact that the protein was not in such a good condition.

*Example 8*

A clear extract containing about 50 g. per litre protein was prepared by a single extraction process as described in the first two sentences of Example 1. This extract was diluted until it contained only about 30 g. per litre protein. 30 g. per litre sodium alginate was dissolved in the diluted extract, and the resulting solution which had a viscosity of about 20 poises, was spun as described in Example 1 into a coagulating bath consisting of a solution containing 100 g. per litre $CaCl_2.6H_2O$ adjusted to pH 1.3. The resulting fibres were withdrawn and washed. They were inferior to the fibres produced as described in Example 1 by reason of their high polysaccharide content.

*Example 9*

In an aged solution containing 200 g. per litre peanut protein at a pH value of 8.5 having a viscosity of 20 poises, 4 g. per litre sodium alginate was stirred and dissolved. The resulting solution, without heating, was spun and coagulated as described in Example 7, and the resulting fibres withdrawn and washed.

Example 10

100 g. isolated soya protein was dispersed in 1 litre water, and the pH value adjusted to 8.5 by means of sodium hydroxide. When the protein had dissolved, 1 g. per litre Gomarine and 4 g. per litre sodium alginate were added, and the solution heated, cooled, spun and coagulated as described in Example 1. The resulting fibres were withdrawn and washed.

Example 11

The process described in Example 10 was carried out, using 100 g. per litre isoelectric casein instead of soya protein.

Example 12

The process described in Example 10 was carried out, using 100 g. per litre of a commercial mixture of blood serum proteins (a mixture of fibrin, albumin and globulin) instead of soya protein.

Example 13

The process described in Example 10 was carried out, using 100 g. per litre of whey protein (a mixture of lactalbumin and lactoglobulin) instead of soya protein.

Example 14

100 g. sodium caseinate was dissolved in 1 litre water, and the pH value of the solution adjusted to 8.5. To this solution was then added 1 g. per litre Gomarine and 4 g. per litre sodium alginate and the solution heated, cooled, spun and coagulated as described in Example 1. The resulting fibres were withdrawn and washed.

I claim:

1. An artificial fibre comprising about 95 to 65% protein and 5 to 35% carrageenin, said percentages being by weight of the dry fiber.

2. An artificial fibre comprising about 95 to 65% protein and 5 to 35% of at least one polysaccharide having ionizable sulphate side groups, said percentages being by weight of the dry fiber.

3. A process for producing artificial fibres consisting predominantly of protein which comprises forming an aqueous, viscous solution containing from 30 to 300 g. per litre of protein and at least one polysaccharide having ionizable sulphate side groups, the ratio of protein to polysaccharide in the solution being at least 2 to 1 and the concentration of the polysaccharide being between 0.1 to 50 g. per litre, maintaining the solution at a temperature between 20° and 100° C. for a time sufficient to permit the solution to develop the desired viscosity for extrusion and then extruding the resulting viscous solution into a coagulating bath having a pH between about 1 and 3 to form fibres.

4. A process for producing artificial fibres consisting predominantly of protein which comprises forming an aqueous, viscous solution containing from 30 to 300 g. per litre of protein and 0.1 to 50 g. per litre of carrageenin, the ratio of protein to carrageenin in the solution being between about 2 to 1 and 20 to 1, heating said solution over a period of about twenty minutes slowly up to a temperature of about 80° C. to develop the desired solution viscosity and then extruding the resulting viscous solution into a coagulating bath having a pH between about 1 and 3 to form fibres.

5. An artificial fibre comprising a mixture of protein and polysaccharide, the amount of protein to that of polysaccharide being in the ratio of between 2 to 1 and 20 to 1, the polysaccharide comprising at least 20 percent by weight of carrageenin.

6. An artificial fiber as claimed in claim 5 wherein said polysaccharide consists of 1 part by weight of carrageenin and 4 parts by weight of algin.

7. An artificial fiber comprising protein and carrageenin, the amount of protein to that of carrageenin being in the ratio of between 2 to 1 and 200 to 1.

References Cited in the file of this patent

UNITED STATES PATENTS

| Re. 21,455 | Bley | May 21, 1940 |
| 2,358,219 | Pringle et al. | Sept. 12, 1944 |

FOREIGN PATENTS

| 25,266 | France | Sept. 26, 1922 |
| | (1st Addition) | |
| 25,298 | France | Oct. 3, 1922 |
| | (2nd Addition) | |

OTHER REFERENCES

The Chemical Age, Nov. 21, 1953, page 1076.

"Algin at Work," Kelco Co., New York, N.Y. (December 1951), p. 6.